Dec. 12, 1967  J. MOLITORISZ  3,357,835
FEED ARTICLE FOR ANIMALS
Filed March 18, 1963
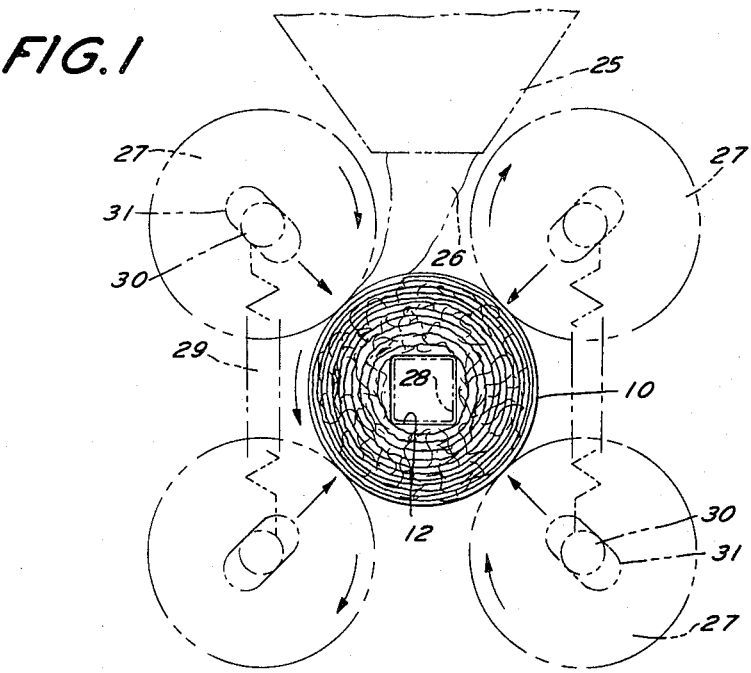
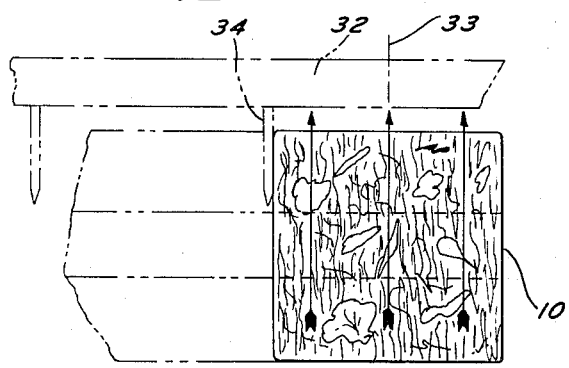
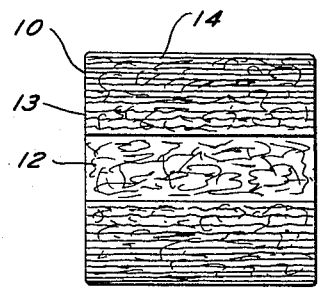
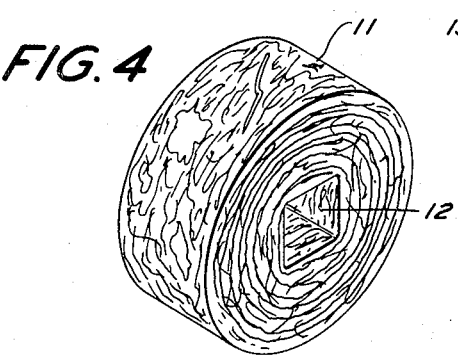
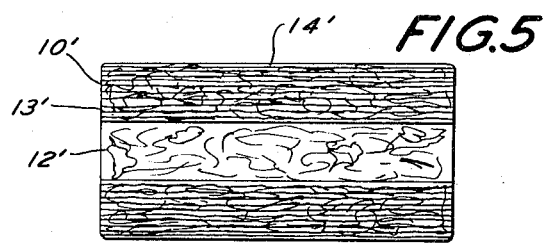
INVENTOR.
JOSEPH MOLITORISZ
BY
ATTORNEY

United States Patent Office 3,357,835
Patented Dec. 12, 1967

3,357,835
FEED ARTICLE FOR ANIMALS
Joseph Molitorisz, East Lansing, Mich., assignor to Michigan State University, East Lansing, Mich.
Filed Mar. 18, 1963, Ser. No. 265,959
4 Claims. (Cl. 99—8)

My invention relates to a feed article for animals, particularly cattle, in the form commonly termed a pellet or wafer, depending upon its relative density or its geometric form. Pellets are usually of cylindrical form and relatively high density, while wafers have been given a disc-like or cubic form and a relatively lower density. Because this invention may partake of some characteristics of each in its present form and in order to simplify and harmonize the terminology used herein, I shall for the most part when I refer to the pellet or wafer per se rather the machine which makes them term by invention a feed article, or refer to it simply as the article rather than the pellet or wafer.

For well over a decade growth of general use of such articles of hay for feeding cattle has been impeded by the relatively poor stability, handling, drying, feeding, and animal acceptability characteristics of the articles. This has been especially true of the growth in those great areas in the country in which high moisture or wet conditions prevail rather than the low moisture or dry conditions which are commonly found in the extreme west. High moisture conditions mitigate against the proper or efficient operation of many presently available wafering machines and when wafers are produced of hay of the higher moisture contents the wafers are very difficult to dry and are extremely subject to mold during storage. The relatively great size, weight, and cost of presently available wafering machines has also impeded growth of general use of pelleted hay for feeding.

The overall object of my invention has been the decrease of these impediments by the evolution of a feed article, efficiently producible by smaller, less heavy and costly, machines under high moisture as well as low moisture conditions, which can be readily dried and will not mold in storage, if properly dried and whose stability, handling, feeding, and animal acceptability characteristics are each and all satisfactory to users in general.

This overall object I have attained in part by constructing the feed article of unchopped hay of the length in which it is originally mowed. In form I preferably give it such dimensions as to be readily acceptable by the animal in its mouth in one piece for mastication, and provide the body with an interior space freely and permanently opened to the direct access of air. In detail I construct the body of a spiral wrapping of hay about an opening, a relatively highly compressed wrapping of crushed, broken and interlocked stems and leaves, compressed to a status of diametral stability, pervaded in considerable part by and aided in its stability by surface waxes and juices exuded from the stems and leaves at appropriate moisture content. In still further detail the article is preferably in the form of a cylinder of relatively small size, having the opening of its interior symmetrically formed about its axis, and having an axial dimension less than its diameter.

Physical characteristics with which I endow my feed article also contribute to my overall aim. Prominent among them are the density and vapor pressure features. In average density the article is preferably of medium high density though very high densities may also be used is desired. Preferably, the density is not so high as to entirely prevent permeability to drying air. Outstandingly, the average density of its inner portions adjoining the opening is less that that of its outer portions.

The manner in which each of the foregoing features contributes individually and in combination with others to the attainment of my overall aim will be the more apparent from the accompanying drawings and description.

Of the drawings:

FIG. 1 is an end view of the article of this invention accompanied by a showing in phantom of an end view of the principle elements of a machine proposed to be used in its manufacture;

FIG. 2 is a side elevation of the article of FIG. 1 with the showing in phantom of another element of the proposed machine and also in phantom a portion of certain other articles being formed by the machine;

FIG. 3 is an axial cross section of the article of FIG. 2 and FIG. 1;

FIG. 4 is a prospective view of an article of less axial dimension than that shown in FIGS. 1-3; and FIG. 5 is an axial cross sectional view of an article of greater axial dimension than that shown in FIGS. 1-3.

Referring now to the drawings, the article of FIGS. 1-3 is generally designated by the numeral 10 while the smaller article of FIG. 4 is similarly designated by the numeral 11. The body of the article 10 is intended to be of dimensions readily acceptably receivable for mastication within the mouth of the animal to be fed. I have commonly produced them of about 2½ inches in diameter and 2½ inches in length, and also of greater length than diameter as shown in FIG. 5. The article of FIG. 4 I have produced of the same diameter but 1 to 1¼ inches thick. In the forms illustrated the opening 12 of the interior or the body of the article to the free access of air is clearly discernable. It is relatively large, of rectangular cross section in these forms of the invention, and extends symmetrically with respect to the axis from one end of the body to the other. I have commonly made it ¾ inch square.

The spiral wrappings about the axial opening 12 are relatively diagrammatically shown by the irregular spiral lines both in FIG. 1 and in FIG. 4. While variations exist, the average angle of the wrapping at large to the axis of the article is 90° as indicated by the arrows in FIG. 2. The number of wrappings may be far less than those illustrated or may be considerably more. Each wrapping so diagrammed is comprised of many overlying stems and leaves of the unchopped hay of the length in which it was originally mowed. The individual stems, of course, cross and recross each other at various angles causing interlocking of the fibers. They become cracked, under the pressures of the rolling to a status of the cylinders' diametral stability, yet a measure of permeability to air is retained. Surface waxes and juices exuded from the stems and leaves aide in the bonding, especially when dried. No attempt has been made to show this bonding material.

Illustration of the physical characteristics, however, has been diagrammatically attempted. The relative densities between the interior portions 13 adjoining the opening 12 and those of the outer portions 14 adjoining the periphery are represented by variations in the spacing between the irregular lines illustrating the spiral wrappings. The wider spacing between the spiral lines adjoining the opening 12 are intended to represent a lesser density than the closer spacing between the spiral lines traversing the outer portions 14. No attempt is made to illustrate such interstices as remain.

The permeability of the product is such that air will readily pass through it for satisfactory drying. The direction of air passage through the product under normal drying techniques will depend on the proportions of the product. The article may have any one of the following three proportions.

(1) Axial dimension substantially less than its diametral dimensions, as shown in FIG. 4.

(2) Axial dimension substantially equal to the diametral dimension, as shown in FIG. 3.

(3) Axial dimension substantially greater than the diametral dimension, as shown in FIG. 5.

When the axial dimension is substantially less than the diametral dimension the article will tend to rest with the center hole in a vertical manner and the air will pass through in the axial direction. When the axial dimension is substantially equal to the diametral dimension the article will tend to rest in a heterogeneous manner and the air will pass through the product moving in a vertical direction. When the axial dimension is substantially greater than the diametral dimension the product will tend to rest with the axial dimension in a horizontal manner and the air will pass through the product most often perpendicular to the axis. I have made all three of the forms described. As made the forms of FIGS. 3 and 4 are intended to be acceptable to the animal in one piece, and the form of FIG. 4 is preferable, because the axial dimension is smaller. The form of FIG. 5 I intend to be acceptable to the animal principally in diametral dimension that the animal shall bite into it from one end or transaxially.

The machine I have used to manufacture the feed articles of my invention is particularly illustrated, described and claimed in a patent application filed of even date herewith. However, I have shown in FIGS. 1 and 2 in phantom and diagrammatically, certain of the principal elements of such a machine, as an aid to better understanding of the constructional and physical features which characterize the articles.

Hay 25 of the length originally mowed is continuously fed from a hopper 26 (used merely as symbolic of a means of continuous feeding) down to the uppermost of a series of rolls 27 which surround equidistantly a rapidly rotating spindle 28. These rolls may be provided with fixed axes and complemental bearings but as shown they are yieldingly borne at one end at least toward the spindle 12 by springs 29 suitably connecting with their axes 30 and biasing the axes through radial slots 31 in movement limiting suitably fixed members (not shown) radially inward toward the spindle 12. Rotations being in the directions shown the hay fed between the upper rolls is borne toward the rapidly rotated spindle 12 and is wrapped about it. Upon its reaching a wrapped diameter contacting the rolls 27 the spirals of hay from this point onward are subjected to very considerable compression due to the springs which bear the rolls radially against it, and finally to the fact that the axes 30 of the rolls bottom in the slots 31 and the pressure is further heightened. If the axes be fixed in position all the compression results from such fixation. The innermost layers are less tightly wrapped because initial compression is absent, and pressure at that time results from wrapping only. The outermost layers are the more tightly wrapped because the pressure of the rolls is added to the pressure of wrapping. As compression progresses the outer layers are moved radially inward and condensing, crushing, breaking and interlocking results. This takes place outstandingly in the outer layers but also in the inner layers. Too the outer layers are subjected to pressure for the longer time. Bonding juices are exuded from the crushed portions. As so completed the articles are pushed off the spindle (by means not shown). When pushed off the spindle 12 the height of pressure exerted on the innermost layers is relieved to a degree by reason of the manufactured opening 12, though the opening per se is retained substantially of full dimension. Thus, through the use of these means (and others not portrayed) the density of certain of the inner portions 13 is made appreciably less than that of the outer portions 14. For good handling conditions I prefer an average inner portion density of approximately 20 pounds per cubic foot and an average outer density of approximately 30 pounds per cubic foot, at 15% to 18% moisture or an equivalent ratio of densities of inner to outer portions 2 to 3.

The material from which I manufacture these articles may be of a wide range of moistures, anything from 15% upwards to the neighborhood of 80% to 90% and within this range they can be dried satisfactorily.

Illustrated in phantom in FIG. 2 is the knife means 31 carried by a bar 32 for severing the wrapped material into the desired axial portions. The knife means are shown inserted into cutting position by lowering the bar 32 while spindle 28 is still rotating but after hay feeding has ceased. Obviously, knife means 31 may have any desired spacing, such for example as to form articles of say half the axial length of the article of FIGS. 1–3, say the length illustrated in FIG. 4. When the axial length (or thickness) is about 1 inch or 1¼ inches it is all the more readily acceptably receivable in the mouth of the animal for mastication. With the axial dimension reduced the diametral dimension may be acceptably larger.

High speed production by rapidly rotating spindles and surrounding rotating rolls assures simplification in the machines of manufacture, reduction in weight and cost, and greater adaptability for field operation. To increase the capacity, one has only to multiply the number of units such as diagrammed in FIG. 1, arranging them horizontally in parallel side by side and rendering vertical pairs of rolls common to the adjoining spindles. Rolls so arranged may be fed more or less directly from the aprons of field pickups.

Insofar as the generic spirits of my invention may be found in feed articles of different geometric form or in equivalent constructional and physical features, the annexed claims are intended to apply to them as well as to the article herein portrayed.

Having thus described my invention, what I claim is:

1. A feed article for animals comprising a bite-size body of hay in the form of an axially open-center cylinder, compacted interlocking layers of said hay extending spirally around said axially open center, said layers having a relatively higher density near the outer perimeter relative to the layers near the open-center core.

2. A feed article as set forth in claim 1 in which the axial dimension is less than the diametral dimension.

3. A feed article as set forth in claim 1 in which the ratio of densities of the outer to the inner peripheral portions is approximately three to two.

4. A feed article as set forth in claim 1 having a dry density in its outer portion of approximately 30 pounds per cubic foot and a density in its inner portion of approximately 20 pounds per cubic foot.

References Cited

UNITED STATES PATENTS

| 704,698 | 7/1902 | Edison. | |
| 776,139 | 11/1904 | Luebben | 99—2 |
| 846,735 | 3/1907 | Duncan | 99—2 |
| 963,775 | 7/1910 | Killman | 99—2 |
| 1,213,284 | 1/1917 | Slathar | 99—8 |
| 3,013,880 | 12/1961 | King | 99—8 |
| 3,191,366 | 6/1965 | Molitorisz | 99—8 |
| 3,244,088 | 4/1966 | Bushmeyer et al. | |

FOREIGN PATENTS

| 622,098 | 6/1961 | Canada. |

OTHER REFERENCES

Dobie: "Production of Hay Waters," Agricultural Engineering, pp. 366–69, June 1960.

A. LOUIS MONACELL, *Primary Examiner.*

D. DONOVAN, J. M. HUNTER, *Assistant Examiners.*